Oct. 14, 1958     G. PARKER ET AL     2,855,793

CONTROL LEVER MECHANISM FOR THIN AEROFOILS

Filed Feb. 25, 1957

United States Patent Office 2,855,793
Patented Oct. 14, 1958

2,855,793

CONTROL LEVER MECHANISM FOR THIN AEROFOILS

George Parker, Clifton-with-Salwick, and Anthony William Parker, Preston, England, assignors to The English Electric Company Limited, London, England, a British company Application February 25, 1957, Serial No. 642,012

Claims priority, application Great Britain March 5, 1956

3 Claims. (Cl. 74—469)

The invention relates to a lever mechanism capable of being accommodated in the confined spaces of thin aerofoils of high speed aircraft.

The invention has the object of attaining a lever ratio in a space which is smaller in one direction from the pivot point than that required by a conventional lever mechanism of equivalent ratio.

According to the invention a two-armed lever to which the load is supplied, is pivoted in the middle on a fixed structure and articulated at its two ends by connecting rods to a point restrained to move only substantially in line with one of the said connecting rods, at least one of the said connecting rods being expansible and contractable by a control force reacting to, or overriding the said load.

This force may be applied longitudinally to the said connecting rod, for example, by means of a built-in hydraulic jack.

In order that the invention may be clearly understood and readily carried into effect an embodiment thereof will now be described by way of example with reference to the accompanying drawing in which Fig. 1 is a diagrammatic side elevation of an aircraft control surface comprising the new lever mechanism, and Fig. 2 shows the said lever mechanism in side elevation on a larger scale.

A lever L to which the load is applied at 0, is pivoted at a point 1 fixed to the structure for example of an aircraft lifting surface. Its ends 2 and 3 are articulated by connecting rods 6–J–7 and 8, respectively to the free end 4 of a link 9, the other end of which is pivoted at 5 to the said structure.

Assuming the lever ratio 0—1 to 1—2 and 1—3 to be 1:2, a load applied at 0 perpendicular to 0—1 will be reacted to at each of the points 2 and 3 by forces acting in opposite directions, applying tension to the connecting rod 8 and compression to the connecting rod 6–J–7, or vice versa. Any movement of the lever L about its pivot point 1 would involve contraction or expansion of member J (hydraulic jack for example) in the connecting rod 6–J–7, and a swivelling movement of the link 9 about its pivot point 5.

Assuming the lever ratio of 1:2 as above, the joints 2 and 3 would each move twice the distance of the movement of point 0 in opposite directions, the link 9 would swivel accordingly about its pivot 5 and the member J would expand or contract four times that distance, reducing the force reacting to the load to one fourth of the latter.

It is clear that the projections of the lever arms 1—2 and 1—3 from the pivot point 1 are only half the projections of a conventional lever mechanism and the movements of the lever mechanism according to the invention are only half of those of a conventional lever mechanism of the same ratio consisting for example of a bell crank lever pivoted on a fixed point at 3 and of a single connecting rod of variable length articulated to said bell crank lever at 2 and to a fixed point 4 (with the link 5, fixed pivot point 1 and connecting rod 8 omitted).

The link 9 may be replaced if desired by a slide containing the pivot 4 and permitting movement only in a direction approximately in line with the connecting rod 8.

What we claim as our joint invention and desire to secure by Letters Patent, is:

1. A control lever mechanism for thin aerofoils comprising in combination: a fixed aerofoil structure, a two-armed lever pivotally mounted at its middle on the said structure, two connecting rods each connected at one end to one arm of the said two-armed lever, and a member restrained to be movable only substantially in line with one of the said connecting rods relative to the said structure, the said two connecting rods being articulated with their other ends to the said member, and at least one of the said connecting rods being expansible and contractable by an external control force.

2. A lever mechanism as claimed in claim 1 comprising a link articulated to the said fixed structure at one end and to the said connecting rods at its other end and positioned substantially perpendicular to the longitudinal direction of one of the said connecting rods.

3. A lever mechanism as claimed in claim 1, comprising a hydraulic jack built into one of the said connecting rods.

No references cited.